(12) United States Patent
Cinquin (10) Patent No.: US 9,895,833 B2
(45) Date of Patent: Feb. 20, 2018

(54) METHOD FOR PRODUCING AN ELECTRICALLY AND/OR THERMALLY CONDUCTIVE PART FROM A COMPOSITE MATERIAL AND RESULTING PART

(75) Inventor: Jacques Cinquin, Igny (FR)

(73) Assignee: AIRBUS GROUP SAS, Blagnac (FR)

(*) Notice: Subject to any disclaimer, the term of this patent is extended or adjusted under 35 U.S.C. 154(b) by 442 days.

(21) Appl. No.: 13/820,757

(22) PCT Filed: Sep. 7, 2011

(86) PCT No.: PCT/EP2011/065493
§ 371 (c)(1),
(2), (4) Date: May 6, 2013

(87) PCT Pub. No.: WO2012/032091
PCT Pub. Date: Mar. 15, 2012

(65) Prior Publication Data
US 2013/0216767 A1    Aug. 22, 2013

(30) Foreign Application Priority Data

Sep. 7, 2010 (FR) .................................. 10 57111

(51) Int. Cl.
*B29C 45/02* (2006.01)
*B29C 70/22* (2006.01)
(Continued)

(52) U.S. Cl.
CPC ............ *B29C 45/02* (2013.01); *B29C 70/228* (2013.01); *B29C 70/24* (2013.01); *B29C 70/882* (2013.01);
(Continued)

(58) Field of Classification Search
CPC ..... B29C 70/228; B29C 70/24; B29C 70/882; B29C 45/02; B64D 45/02; B64G 1/50;
(Continued)

(56) References Cited

U.S. PATENT DOCUMENTS

2004/0084103 A1* 5/2004 Tsotsis ...................... 139/420 R
2010/0021682 A1* 1/2010 Liang ................ D03D 15/0011
    428/103
2010/0282736 A1* 11/2010 Koch et al. ................... 219/553

FOREIGN PATENT DOCUMENTS

DE        100 05 202 A1 * 11/2000
GB         1303593      *  1/1973

OTHER PUBLICATIONS

Campbell, F.C., Manufacturing Processes for Advanced Composites, 2004, Elsevier Advanced Technology, pp. 303-356.*
(Continued)

*Primary Examiner* — Brian Handville
(74) *Attorney, Agent, or Firm* — Young & Thompson (57) ABSTRACT

In order to produce a part (16) from a composite material, which is conductive at least on one of the surfaces thereof, the method consists of: the conductive overstitching (30) of a preform (20) of the part using electrically or thermally conductive threads (31, 32) with substantially parallel stitch lines (34) oriented in at least two intersecting directions. The parts obtained are adapted for the production of aircraft structures that may be subjected to lightning strikes and allow return currents from the electrical or electronic aircraft equipment and/or the discharge of heat by conduction.

14 Claims, 3 Drawing Sheets

(51) Int. Cl.
  *B29C 70/24* (2006.01)
  *B29C 70/88* (2006.01)
  *B64C 1/12* (2006.01)
  *B64D 45/02* (2006.01)
  *B64G 1/50* (2006.01)
  *B32B 5/06* (2006.01)
  *B29K 707/04* (2006.01)

(52) U.S. Cl.
  CPC ................. *B32B 5/06* (2013.01); *B64C 1/12* (2013.01); *B64D 45/02* (2013.01); *B64G 1/50* (2013.01); *B29K 2707/04* (2013.01); *B29K 2995/0005* (2013.01); *B29K 2995/0013* (2013.01); *Y02T 50/433* (2013.01); *Y10T 428/24033* (2015.01)

(58) Field of Classification Search
  CPC ......... B32B 5/06; B64C 1/12; B29K 2707/04; B29K 2995/0005; B29K 2995/0013; Y02T 50/433; Y10T 428/24033
  USPC .............................. 428/102; 361/218; 156/93
  See application file for complete search history.

(56) References Cited

OTHER PUBLICATIONS

Mechanical Lugs, About Wire, Jul. 6, 2010, Advancement International Ltd., http://web.archive.org/web/20100706100508/http://mechanicallugs.com/index.php/stranded-vs-solid.*
Machine Translation of DE 100 05 202 A1. Nov. 2000.*

* cited by examiner

METHOD FOR PRODUCING AN ELECTRICALLY AND/OR THERMALLY CONDUCTIVE PART FROM A COMPOSITE MATERIAL AND RESULTING PART

The present invention belongs to the field of composite materials including fibers embedded in a hard organic matrix.

More particularly, the invention relates to a method for producing a part from a composite material and having, on its surfaces and within its thickness, electrical and/or thermal conduction controlled properties, and also relates to such a composite material part.

BACKGROUND OF THE INVENTION

Composite materials formed with long fibers embedded in a rigid organic matrix are well known and widely implemented in the production of structure parts, whether being heavy loaded working structures or simple fairings more slightly loaded.

The advantages of such composite material parts are various but, according to the intrinsic performances of fibers, the used resins and to the applied implementation techniques, the parts are obtained with possible benefits on the resistance, the mass, the complexity or the cost, in particular, relatively to equivalent parts which would be made from metallic materials.

One more generally finds parts which are produced by implementing glass fibers, aramid fibers or carbon fibers or a combination of these fibers.

Apart from parts of limited dimensions and resistances, or from particular applications like those implementing a three dimensions said 3D weaving, the fibers are generally arranged in successive layers within the thickness of the parts to be produced in order to form plies whose the accumulation forms the local thickness of the part and gives to the latter its resistance and its rigidity when the fibers are embedded into the hard matrix.

A characteristic of the considered composite parts is their low intrinsic electric conduction because of the implementation of matrices containing insulating organic resins and of the fibers which are themselves made from materials included into the category of electrical insulators (aramid fibers or glass fibers) or into the category of materials considered as slightly conductive or as bad electrical insulators, typically the carbon fibers in the considered application field.

A similar behavior is also observed, on the thermal level, with respect to these materials for which the mechanical performances have generally a priority on the thermal conduction characteristics at the choice time of the materials to implement in order to produce a part.

In some applications, in particular when currents must be transported by the structure, it is necessary to deposit on the surface of the composite material structures, electrically conductive elements.

Thus in the case of the aircraft structures which are likely to be subjected to lightning strikes, a metal netting, generally made of bronze or copper, is fixed on a face of the composite material parts, a netting of which the surface density is adapted to the currents having to be supported to disperse the currents induced by the lightning strikes.

In the absence of such a metallization the composite material structure, unable to disperse the energy brought by an lightning strike, is likely to be damaged locally by the lightning and to require in this case urgent repairs.

Moreover, contrarily to the metallic structures, these composite structures are not able to provide the function of current return for an electric system and it is, for example necessary in the case of aircraft with a composite material structures, to install electric conductors in order to ensure the current returns for the electric systems or to use elements having a metallic structure and presenting an electrical continuity adapted with a sufficient reliability to ensure the current return for the electric systems.

To such a solution, constraining in itself at the design level by the respect of the required electric routes and electrical continuity necessary and by the protection constraints of the metallic structures relatively to the composite structures when those use carbon fibers, in particular, is added to the need of metallization of the structure in order to protect it from the effects of the lightning and it proves to limit the expected benefit of the generalized use of composite material structures, in particular for aircraft.

When it is necessary to increase the thermal conductivity of the part structure, particularly, when heat of an equipment supported by the structure must be evacuated by this structure, a known solution consists in charging, during the production of the part, the organic matrix with metal particles to improve the thermal conduction of the obtained material.

This solution presents however the defects of not to be realizable with all the methods for producing the composite material parts and to require a rather high load in proportion of the resin and fibers to ensure a significant increase of thermal conduction which induces a weight increase of the carried out part and a reduction in its mechanical resistance which must be taken into account at the design.

SUMMARY OF THE INVENTION

The present invention proposes a method for producing of composite material parts which bring a solution to produce the part while ensuring an improvement of the electric and/or thermal conduction properties of this one on one of its faces or on the two faces and/or within the thickness.

The manufactured part according to the method of the invention is a composite material part including insulating or slightly conductive fibers, distributed along the plies piled up within a thickness E of the part and embedded, in the manufactured part, into a hard organic resin matrix.

According to the method a conductive overstitching including upper threads and lower threads, an upper thread crossing an upper thread at a stitch in accordance with known overstitching types, is carried out on a preform, made up of all or a part of the plies ordered the ones relatively to the others and according to the orientations that the plies must respect in the manufactured part, the conductive overstitching being realized in a step of the method during which the resin of the matrix is not hard or then which the fibers of the plies are not yet impregnated and by using for at least one of the upper or the lower threads of the conductive overstitching an electrically conductive thread, i.e. a thread in a material recognized as a good electricity conductive, or thermally conductive thread, i.e. a thread in a material having thermal conduction properties substantially higher than those of fibers or matrix of the considered composite material.

The conductive threads thus naturally form on at least one of the faces of the preform a set of elements which can be arranged in various manners according to patterns regarded as optimal, at a step of the part manufacture where it is easy to deposit conductive threads by conventional stitching means, the conductive threads remaining at the surface of the part when the resin is introduced and/or hardened in a later step of the part manufacture.

Advantageously the conductive overstitching is carried out in substantially parallel sewing lines according to a first main direction and in substantially parallel sewing lines according to at least a second direction different from the main direction so that the conductive threads of conductive overstitching cross themselves on the considered face of the preform corresponding to these conductive threads.

These conductive threads then form on at least a face of the preform a network of conductive threads in contact at their intersection to improve the electric or thermal continuity between the network threads.

Thus, when the threads are made of an electrically conductive material, the considered face of the manufactured part is substantially at an equipotential level such as, for example, with a conventional metallization by a bronze netting.

In an implementation mode, the parameters of the conductive overstitching are adjusted so that at each stitch of the overstitching crossing the preform, the upper thread and the lower thread are crossed in a median part of the preform thickness, which makes it possible to check the conduction characteristics within the thickness of the preform and thus of the manufactured part.

In another implementation mode, the parameters of the conductive overstitching are adjusted so that at each stitch of the overstitching crossing the preform, the upper thread and the lower thread are crossed at a lower face of the preform on the side of which lower face is the lower thread which makes it possible to guarantee that one of the threads crosses the preform rightly through and that the other thread remains completely at the surface on a preform face.

When the conductive overstitching is carried out by using conductive upper threads and conductive lower threads, the two faces of the preform as well as the thickness, and thus of the manufactured part if the preform relates to all the plies of the part, are kept in continuity relationship by the conductive threads, for example in electrical continuity if the threads are electrically conductive in order to form a metallization of the part.

When the conductive overstitching is carried out by using conductive upper threads and lower non conductive threads or by using upper non conductive threads and conductive lower threads, only one face is made conductive, for example by metallization if the overstitching thread is electrically conductive.

To carry out conductive overstitching types of quality with conventional machines requiring both flexible and very conductive threads, the conductive threads consist of an assembly of metal strands, preferably twisted the ones to the others or of carbon thread having reinforced thermal conduction properties.

Advantageously, in the case of a metallization, according to the functions having to be ensured by metallization and according to the characteristics of the used conductive threads, the distances D between substantially parallel neighboring sewing lines are given to obtain a metallization surface density of the preform ranging between 30 and 500 g/m2.

Moreover, according to the characteristics of the used conductive threads, the lengths P between the successive stitches of a sewing line are given to obtain, at least locally, a conductive section of the conductive overstitching threads crossing the preform according to its thickness ranging between 1000 and 50000 mm2 per m2 of the part surface.

It is thus possible to choose, at the designing of the part, electric conduction characteristics through the thickness of the part as well as thermal conduction characteristics, in particular by the choice of the conductive overstitching threads from materials having an improved thermal conduction and/or by the choice of the electrically conductive materials which have, in a general way, a thermal conductivity much higher than the considered composite materials.

The conductive overstitching can be carried out on a dry preform which can in addition be powdered or not with grains of a thermoplastic resin or still be carried out on a preform whose fibers of the plies are preimpregnated of a not hardened resin, and, in a general way, in situations in which the preforms can be easily crossed by the stitching needles used to carry out the conductive overstitching.

The invention also relates to a part such as a part being able to be produced by the method of the invention.

Such a composite material part includes insulating or slightly conductive fibers embedded in a hard organic matrix, in which the fibers are arranged in superimposed plies according to the part thickness between an upper face and a lower face of the part.

Moreover upper threads on the upper face side and lower threads on the lower face side, arranged in sewing lines according to at least two secant directions, cross all or a part of the plies at stitches and the upper threads and/or the lower threads are electrically conductive so that they determine on the surface of the part, on at least a corresponding upper, respectively lower, face a network of conductive threads and in contact at the thread intersections, conferring to piece improved electric and/or thermal conduction characteristics, for example, a metallization of the part on one of its faces or its two faces.

Advantageously, when only one face of the part must be made conductive, only the upper threads or only the lower threads are conductive, and the conductive threads do not cross all the thickness of the part at the stitches.

To obtain good properties of conduction, the conductive threads arranged in sewing lines are metallic threads, in particular, containing copper, aluminum or a steel, or carbon threads having improved thermal conduction, substantially higher than the thermal conduction of the fibers or the composite material matrix of the part, formed by an assembly of several strands which ensure the flexibility of these threads at their arrangement and limit the risks of threads ruptures under the effect of vibrations and deformations of the part under loads.

To obtain these qualities, preferably the conductive threads have conductive sections ranging between 0.005 mm2 and 0.50 mm2 and include between 1 and 50 strands.

According to the characteristics when the implemented conductive threads are electrically conductive threads, the distances D between neighboring sewing lines determine on the considered face of the part a metallization ranging between 30 and 500 g/m2 according to the metallization requirements.

Also according to the implemented conductive threads characteristics and the expected conduction performances between the part opposite faces, the stitch density on the part surface is locally included between 2500 and 250000 stitches per m2.

Moreover on the produced part, the surface density of overstitching conductive threads and/or the density of stitches are variable according to sites on the part surface so that the conduction performances, for example the electric performances of the metallization obtained with electrically conductive overstitching threads, can be adapted with a minimal impact on the mass of the part.

To ensure an electrical and/or thermal contact of high quality between assembled parts, on the part of the invention, the surface density of conductive threads and/or the density of stitches are increased in areas corresponding to fitting surfaces between the part and one or more other conductive parts such as metallic parts or composite material parts having improved conductive properties.

In an advantageous application of the invention, such a part is intended to an aircraft structure and includes on at least one of its faces a metallization carried out by means of an electrically conductive overstitching thread intended to ensure the current return for the aircraft electric or electronic components and/or includes on at least one of its faces a metallization intended to protect the composite material part against the effects of a lightning strike.

In another application of the invention for which the thermal conductivity of the conductive overstitching threads is considered, such a part is intended to a satellite structure and includes a conductive overstitching carried out with a material having improved thermal conduction intended to evacuate the heat from satellite areas including thermal sources secured to said structure. In this case the stitching thread is for example a metallic thread or a non metallic thread having a significant thermal conductivity like specific carbon.

BRIEF DESCRIPTION OF THE DRAWINGS

The description of an implementation mode of the method and the parts from composite materials of the invention is made in reference to the figures that represent.

DETAILED DESCRIPTION OF THE PREFERRED EMBODIMENTS

The present invention applies to composite material parts including of long mineral or organic, insulating or slightly conductive fibers, such as glass fibers, aramid fibers, carbon fibers . . . , embedded in a rigid organic matrix.

Within the context of this description, the expressions "insulating or slightly conductive" and "conductive" must be generally understood as meaning "electrically and/or thermally insulating or slightly conductive" and "electrically and/or thermally conductive" excepted if otherwise specified or if it is obvious in a particular context for a skilled in the art that it is a different meaning.

The expressions "insulating or slightly conductive" and "conductive" must also be understood on the electric level with a meaning which is given to them in the electromechanical industry, i.e. for the electrically insulating materials, materials being able to be used as insulator such as glass or most of polymeric materials, for the slightly conductive materials, materials generally considered as insufficiently conductive of electricity to be used to transport the electric power and too conductive to be used as insulator, such as carbon fibers, and finally for electrically conductive materials, the materials generally recognized as being able to be used in the context of electric power transport, i.e. most of metals and current metallic alloys.

By way of illustration, the carbon fibers, considered as slightly conductive, have an electrical resistivity generally ranging between $1.5 \cdot 10^{-6}$ $\Omega$.m and $1.5 \cdot 10^{-5}$ $\Omega$.m, values which are to be compared to those of ordinary metal conductive materials of about $10^{-8}$ to $10^{-7}$ $\Omega$.m or to that of the ordinary insulating materials whose resistivity is higher than $10^{10}$ $\Omega$.m and often exceeds $10^{15}$ $\Omega$.m.

Generally the invention has the aim of improving the electric and/or thermal conduction characteristics of parts produced from composite material, whose performances are limited on the electric or thermal levels, and when the term "conductive" is used as characteristic of an overstitching thread, it must be understood that in the present invention the overstitching thread has "conduction characteristics substantially higher than those of the fibers and the matrix of the considered composite material".

More particularly the invention applies to composite material parts which, during their producing processes include a step of forming several fiber plies piled up and compacted together under conditions in which the plies are not yet immobilized into the rigid matrix.

The fibers of a ply can be organized in layers, in which the fibers have all substantially the same orientation, or in fabrics, in which the fibers have at least two different orientations and are arranged to form the fabric or also in a mat in which the fibers do not have orientations privileged within the plan of the ply.

In this step of forming, the plies are, for example, impregnated of a resin in a pasty state before a phase of resin hardening by polymerization or are, for example, handled in as dry fabrics having to be the subject of a later impregnation by a liquid resin (case of the RTM method: Resin Transfer Molding) which is hardened after this impregnation.

For the needs of the detailed description of an implementation mode of the method of the invention, it will be considered in a nonrestrictive way the case of a part carried out by a RTM method in which the fibers are first arranged the ones to the others as a dry preform and then placed into a mold to be impregnated of resin by transfer.

Figure 1:
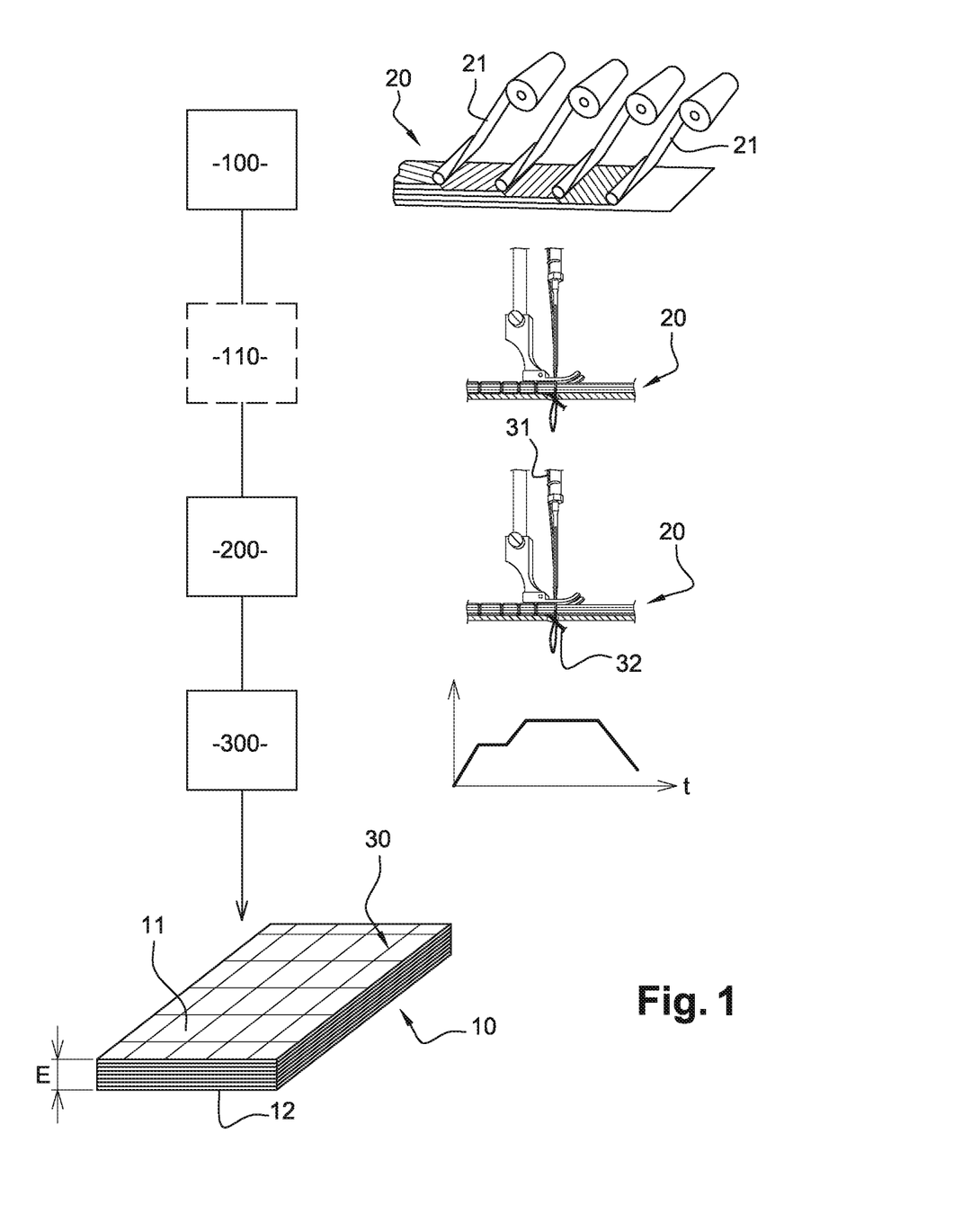
FIG. 1: a diagram of the main steps of the method of the invention.

In a first stage 100 of the method for producing a part 10 according to the invention, a preform 20, in the considered example, a dry preform, is carried out by a stacking of plies 21 of dry fibers according to a conventional method for producing preforms.

Into the parts produced according to this method, the plies 21 are placed in layers substantially parallel the ones to the others, also substantially parallel to an upper face 11 as to a lower face 12 of the part 10, and the plies accumulation determine a thickness E of the part to produce.

In particular the desired number of plies is deposited according to the sites on the part 10 by taking into account the desired orientations for the fibers of each ply, the plies number and the orientations of fibers being given at the design of the part.

If necessary, during an optional step 110 for beforehand assembly of the plies, the various plies 21 are maintained the ones to the others by an overstitching by means of conventional threads intended for this use which can be of same nature that the fibers of the preform, here still according to a conventional method in the field of the production of dry preforms.

The overstitching consists in carrying out stitches, most generally in successive sewing lines more or less spaced, by mean of threads which, at each stitch, cross the whole of the plies making the thickness of the preform and which thus keep the various plies the ones to the others.

Most generally, during the realization of a sewing line by stitching, the stitching is carried out according to the technique of the shuttle points by using two threads.

A first thread, stored on a main reel, crosses the eye of a needle which will make this first thread to cross the plies to prepare the overstitching, from a face of the preform corresponding to the upper face of the part to produce, at level of the stitches. This first thread is called the upper thread.

A second thread, stored on a secondary reel called a quill, ensures the locking of the upper thread at each stitch, by crossing the upper thread at a loop formed by said upper thread, on the side of a preform face opposed to the crossed face corresponding to the lower face of the part to produce. This second thread is called the lower thread.

By extension the expressions "preform upper face" and "preform lower face" will indicate thereafter the faces of the preform corresponding to the faces of the part 10 to be produced, respectively the upper face 11 and the lower face 12.

The overstitching previously described, optional with respect to the needs for the present invention, is called an insulating overstitching because it does not lead in itself to any significant change of the part conduction characteristics.

This insulating overstitching, which has as an essential function to stabilize the preform and to avoid the displacement of the plies the ones to the others during the preform handling before the injection of the matrix phase or during this injection phase, will be, however, as it will be understood later on, limited, or even removed at the profit of an overstitching as described in the continuation of the method.

In a second step 200 of the method, the dry preform 20 receive an overstitching according to sewing lines by using upper overstitching threads and/or lower overstitching threads made from an electrically or thermally conductive material as above specified.

This overstitching, in which the upper threads or the lower threads or the two upper threads and lower threads are made from a conductive material, is called a conductive overstitching 30.

The principle of overstitching is known and is not described here more in detail. It applies obviously to the possible insulating overstitching but also to the conductive overstitching 30 which is distinguished primarily by the nature of overstitching threads and which can imply particular adjustments taking into account the characteristics (diameter, number of strands in the thread, resistance, ductility, . . . ) of the used threads, but which however implement the same principles.

The two overstitching types, insulating and conductive, are in addition independent when they coexist on the same preform, and for the needs of the realization of these two overstitching types, the indicated upper and lower faces can if necessary be reversed as the skilled in the art will understand it at the reading of the description of the invention.

Such a conductive material is for example copper or an copper containing alloy because, on the one hand, of its of electrically or thermally conduction properties, but also of its mechanical properties, in particular its malleability which gives to the copper thread an expected flexibility, and of its electrochemical properties, which make compatible its use with composite materials incorporating carbon fibers, on the other hand.

Such a conductive material is for example a thread having an improved thermal conduction such as a specific carbon thread, whose thermal conduction action can be required alone or be associated to that of electrically conductive materials on which it has the advantage of a more reduced mass for the same thermal result.

A specific carbon thread whose thermal conduction properties are improved is, for example, a thread obtained from a coal or oil pitch, carbon thread from a precursor of pitch type.

The thermal conductivity of carbon fibers from a precursor of pitch type is much higher, up to 800 W/m·K (for example, the fiber distributed under reference K13D2U from the Mitsubishi Chemical company), than that of threads obtained from PolyAcryloNitrile, carbon thread from a precursor of PAN type, of on average 20 W/m·K, a value which must also be compared to the thermal conductivity of an epoxy resin used as matrix and whose thermal conductivity is lower than 1 W/m·K.

On the other hand, the tensile strength of carbon threads from a precursor of pitch type is substantially lower, typically, from 2 to 3 times weaker, than that of carbon thread from a precursor of PAN type, the reason for which the fibers of this second category are preferentially used in the structure applications from composite materials, but these reduced performances on tensile strength of threads from a precursor of pitch type is not penalizing for the use as overstitching threads.

However the threads for the conductive overstitching 30 can be made from any other material recognized as having good electric and/or thermal conduction characteristics, which is the case of many metallic materials or their alloys such as iron or aluminum, whether these metallic materials are used pure or in the alloy form, or also in the form of strands of a first material plated with a second material, under the condition of their electrochemical and rheological compatibilities with other materials implemented into the composite material part.

In a third step 300, when the conductive overstitching 30 of the dry preform has being carried out, said dry preform 20 is impregnated with a resin in the liquid state according to a conventional technique, like the technique of resin injection of the method known under the acronym RTM, a technique in which the dry preform 20 is placed in a mold during the resin injection and is maintained until the hardening of the resin.

At the end of this third step 300, the conductive threads of the conductive overstitching 30 are located at the surface of part 10, on the upper 11 and lower 12 faces, as they were on the preform 20 surface at the end of second step 200 of the method, and form on said surfaces a network of conductive threads according to the patterns formed by the sewing lines of the conductive overstitching carried out on preform 20, a thread network whose the electric and/or thermal continuity is ensured, on the one hand, by the direct contacts between upper and lower threads and between the various conductive oversewing lines on the other hand as it will be understood thereafter.

The obtained part 10 made of composite material presents then an electric and thermal behavior of its surfaces and between its surfaces whose characteristics are determined by those of the conductive overstitching 30 carried out on the dry preform 20.

According to the way in which the method is implemented, the obtained parts and their characteristics are adapted.

During the second step 200, the conductive overstitching 30 is carried out on the dry preform 20 in all the areas corresponding to surfaces or volumes of the part 10 having to be made conductive, these surfaces or volumes being defined at the designing of the part 10.

In the case of this conductive overstitching, the density of the conductive overstitching 30 carried out has not for main purpose to ensure the maintenance of plies 21 of the dry preform 20 as in the case of the insulating overstitching, even if this conductive overstitching is able to ensure this maintenance and thus to avoid or limit the need for an insulating overstitching, but to generate, at the surface and within the thickness of the preform 20, at this stage of the method, and of part 10 to produce at a later stage, a conductive pattern having desired electric and/or thermal conduction characteristics.

The conduction characteristics are indeed determined by:
the characteristics of upper 31 and lower 32 threads of the conductive overstitching, in particular their sections and the materials used for said conductive overstitching threads,
the characteristics of the conductive overstitching 30 itself which can be carried out:
with more or less long points characterized by a distance P between two successive stitches 33 on a sewing line,
with sewing lines 34 parallels or not, carried out at a local separation distance D between the more or less tightened sewing lines,
with secant sewing lines formed in different directions, for example, in a first main orientation and in a second orientation at 90 degrees from the first orientation or also at more or less 60 degrees from the first orientation, and crossing then to form at the preform surface a more or less dense network of conductive overstitching threads, the obtained meshes for said network being more or less tight.

By carrying out secant sewing lines, the threads of the conductive overstitching overlap on the preform surface and the conductive threads are then in electric and thermal continuity.

Indeed, even if in certain case the physical contact is not totally ensured at each thread intersection, the number of contact points in a network including many secant lines guaranteed in the practice that all the conductive threads are connected the ones to the others.

One thus understands that the skilled in the art, by the choice of these various parameters, is able to ensure the desired conduction characteristics on the surface, and within the thickness between the faces, of a part 10 made of composite material and that these conditions can be modified in various points of the same part and also along given preferential directions in a point of the part surface.

Figure 2A:
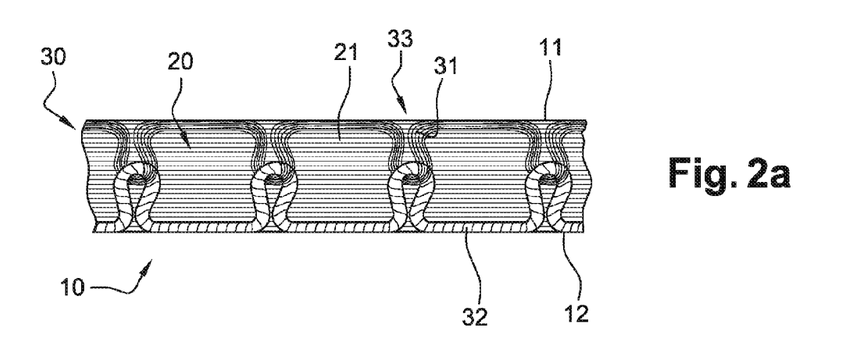
FIGS. 2a and 2b: sections of composite material parts at a sewing line for two examples of stitches.
Figure 2B:
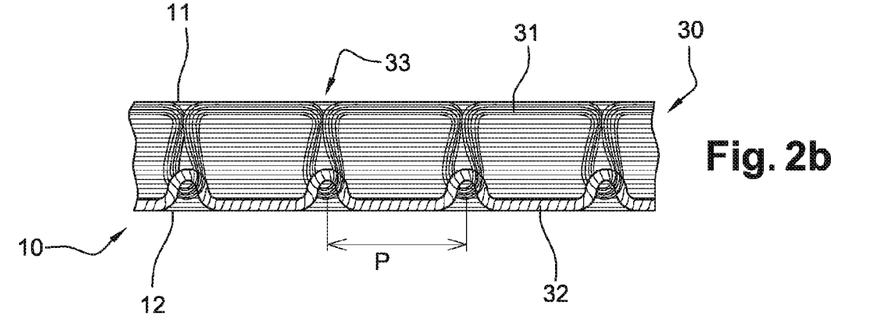

As FIGS. 2a and 2b, which represents sections of parts obtained by the method, illustrate it, each upper 31 or lower 32 thread of a sewing line of the conductive overstitching 30 form a conductive line at the surface of the corresponding face, respectively the upper 11 or the lower 12, and crosses all or a part of the preform 20 and thus of the part 10 at stitches 33.

In the case illustrated on FIG. 2a, the upper thread 31 and the lower thread 32 cross at each stitching substantially at mid-thickness of the preform 20 or part 10, or at least in a median part the thickness so that, at a stitching, the upper thread 31 does not reach the lower face 12 of the part and the lower thread 32 does not reach the upper face 11 of the part.

In the case illustrated on FIG. 2b, one of the threads of the conductive overstitching, the upper thread 31 in the represented example, substantially crosses the part in all its thickness to the opposite lower face 12 whereas the other thread, here the lower thread 32, is maintained near the lower face 12 and away from the upper face 11.

To obtain such characteristics of the conductive overstitching, by acting in particular on the thread stretching during the operations of stitching, makes it possible to ensure surface conduction characteristics of the part 10 adapted to specific needs, particularly, when conduction should not have to present the same characteristics on the two faces of part 10.

Thus, by choosing a conductive or insulating upper thread 31 and a conductive or insulating lower thread 32, the method allows to carry out on preform 20 a conductive network so that part 10 is made conductive:
on its two faces, the conductive networks of the two faces being connected on the electric and/or thermal level, the upper thread 31 and the lower thread 32 being selected as conductive,
on only one face without conductive crossings by using a conductive thread not crossing completely the thickness of part 10 at stitches 33, the upper thread 31 or the lower thread 32 in the example of FIG. 2a or the lower thread 32 in the example of FIG. 2b, and by using a non-conductive thread for the other thread,
on a face with conductive crossings by using a conductive thread at crossing stitches 33, as in the case of the upper thread 31 in the example of the FIG. 2b, the other thread being non-conductive.

The conductive overstitching types which have been just described whose characteristics can be modified according to the part to make conductive or according to sites on the part 10 surface can be produced by any known overstitching technique.

Advantageously the various conductive overstitching types will be carried out by means of numerical control overstitching machines and the operations for realizing the conductive overstitching will be carried out to optimize the conduction characteristics in each area of the part 10 surface.

Such an optimization allows, particularly by using electrically conductive threads to metallize a composite material part, to avoid a weight increase resulting from the implementation of conventional metallization techniques with bronze netting in which such an optimization is impossible or at least would be very complex to carry out by applications of netting having different characteristics according to the area on the part surface.

The interest of the method of the invention and the variety of parts with improved conduction being able to be obtained will be better understood by considering, by way of nonrestrictive illustrations, the following examples.

Figure 3:
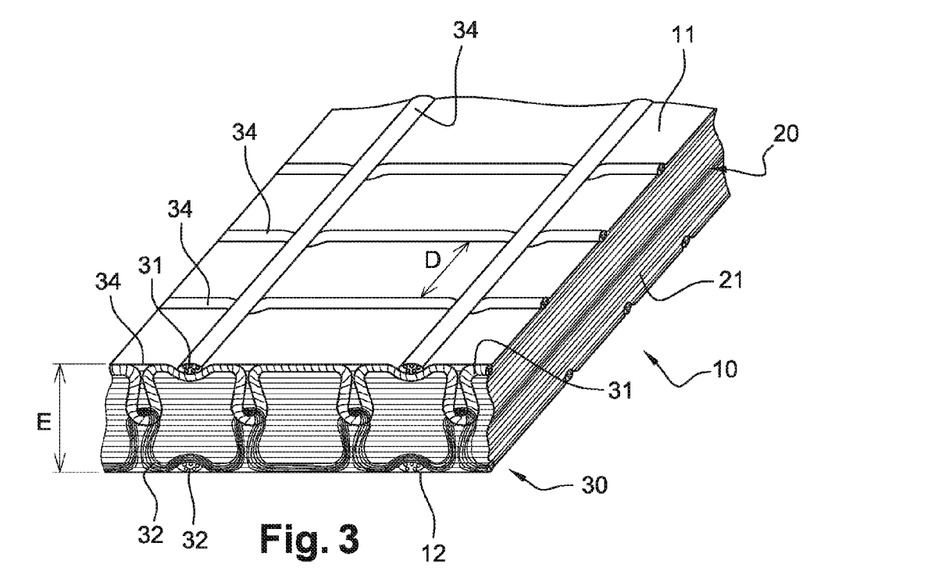
FIG. 3: a diagrammatic perspective view for a part of the invention such as it can be obtained by the method.

In an application of the method to the metallization of a part, a part 10 from a composite material produced according to the method called RTM is carried out from a dry fiber preform whose plies received an overstitching with upper and lower electrically conductive threads 31, 32 along the sewing lines 34 substantially parallel to a first main direction on the part surface and according to a second direction substantially perpendicular to the main direction as schematized on FIG. 3.

The distance D separating two parallel sewing lines is, for example, of 5 mm for the two directions of the sewing lines, thus forming on the preform upper and lower faces a network of square meshes of 5 mm by side.

In the case of the part represented on FIG. 3, the represented meshes are rectangular. The square and rectangular shapes of the meshes constitute only simple examples, the meshes also being able to be in rhombus with two nonorthogonal sewing lines and being able to present many other regular or not polygonal forms when more than two sewing directions are used.

To obtain a part metallized on its two faces, but including a metallization having different characteristics on the upper face 11 and the lower face 12, the upper thread 31 is selected with a conductive section different from that of the lower thread 32.

For example the upper thread 31 is carried out by 20 twisted strands of 50 micrometers in diameter whereas the lower thread 32 includes only 10 of them.

The use of copper threads with these parameter values makes it possible to carry out a part having a metallization of approximately 140 g/m2 on the upper face 11 and of 70 g/m2 on the lower face 12, two metallized faces being in electrical continuity by the stitches.

In the practice the threads will comprise, without any particular implementation difficulty, from 1 to 50 strands that may lead to a diameter from 0.05 to 0.20 mm.

Such a composite material part is thus provided with a metallization sufficient to ensure a protection against the effects of the lightning in the event of lightning strike on the upper face while making it possible to ensure the electrical continuity of current return line including from the lower face.

The metallization density is obviously adaptable according to the requirements of the part by choosing the thread section and the distance between the sewing lines.

In another more general application of the method, the quantity of conductive material brought by the conductive overstitching threads per surface unit on the part faces is modulated in areas on the composite material part according to the locally expected characteristics while acting on the distances D between the sewing lines of the conductive overstitching and/or by modifying the sections of conductive threads used for the conductive overstitching.

Thus, in the case of application of the method to the metallization of a part, some areas requiring a relatively dense metallization, for example because of a strong risk of lightning strike, include relatively closer sewing lines for the conductive overstitching and/or conductive thread sections relatively higher comparatively to areas having a low risk of impact, areas without any risk can even not include any conductive overstitching at the profit, if necessary, of an overstitching insulating a priori less heavy.

Another reason to create areas having a surface metallization of at least locally increased density corresponds to the need to form, on the surface of the composite material part, preferential routes for the electrical currents.

It is then in this case possible to create these surface routes or lines by increasing the density of the electrically conductive overstitching in the preferential routes areas. Advantageously the sections of the used threads for the electrically conductive overstitching will be selected according to the expected currents and the required electric conductivity for these lines, as well as to the distance D separating the neighboring sewing lines of electrically conductive overstitching, at least for the directions of the sewing lines directed to follow the selected routes.

A reason to create an area having particular thermal conduction properties is, for example, the need for fixing on the part an equipment releasing heat having to be evacuated by the part structure. In this case the density of the overstitching with a thermally conductive thread is advantageously increased at the surface having to be in contact with the equipment or its support.

According to whether heat must preferentially be evacuated in a direction and from a part face, the conductive overstitching will be carried out as described previously by privileging or not conduction through the thickness of the part and on each face of the part towards preferential directions or routes, particularly when the thermal energy must be led towards a particular site of the structure such as a heat well or an equipment intended to cool an area.

Figure 4:
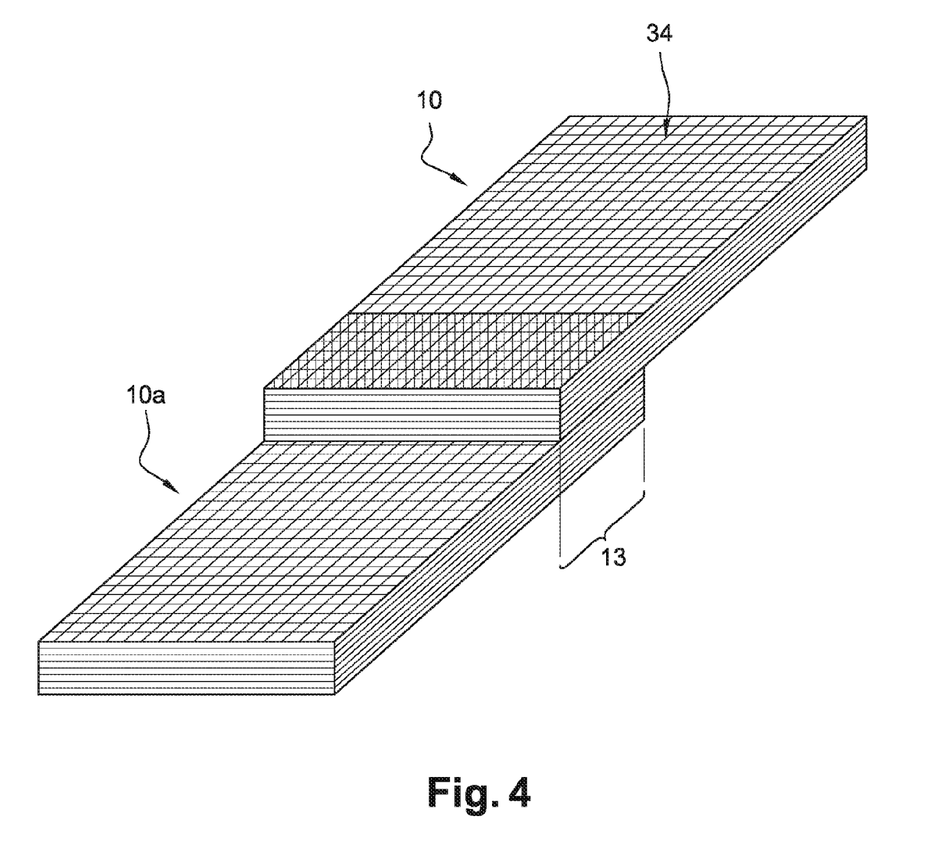
FIG. 4: a diagrammatic illustration of an assembly of a part of the invention with another part.

In an application of the method schematically illustrated on FIG. 4, it is also carried out, on contact areas 13 of a part 10, by which contact areas, the part must be assembled with other conductive parts 10a, an increased density of conductive overstitching at least on the part face having to be in contact with the assembled part, in order to ensure an improved electric and/or thermal continuity between the assembled parts.

In the example of FIG. 4, the part 10 is metallized on the upper face 11 but is assembled with the metallic or made of metallized composite part 10a, at a contact area 13 of the lower face 12 at the edge of the part which, in this example, can not be metallized or not sufficiently metallized to guarantee the required electrical continuity between the part 10a and the upper face 11 of part 10.

In the contact areas 13, to obtain the required electrical continuity, the lower overstitching thread 32 is electrically conductive with, on the one hand, an adapted thread cross-section and also adapted separation distances between the sewing lines, a priori, sections being increased and the distances decreased, and on the other hand the distance P separating the successive stitches is advantageously decreased in order to increase the number of stitches in the contact area and thus that of connections between the two faces of the composite material part and thus to improve the electrical continuity between the two assembled parts by a resulting increase of the electrical conductor effective crossing section.

By decreasing the distance D between the sewing lines 34 in these areas, this also increases in a statistical way the number of electrical contact points between the two parts 10 and 10a and thus the guarantee of a satisfactory electrical continuity.

In another embodiment a part is metallized on only one of its faces without however that conductive elements cross the part thickness. This result, obtained by using an electrically conductive thread for the face having to be metallized and an electrically insulating thread for the part face not having to be metallized and by carrying out a conductive overstitching in which the conductive thread does not reach the face not having to be metallized, allows to metallize parts for which the crossing of electric charges and a flashing on the not metallized face must be avoided, for example, due to the presence of flammable vapor.

Another embodiment of the method to obtain a similar result for the carried out part consists in carrying out a conductive overstitching with electrically conductive threads on a part of the preform plies which in the part to be realized will be situated on the side having to be metallized in order to create a first partial preform.

Then the other expected plies of dry fiber of the preform are placed on the face of the partial preform on the side of the part not having to be metallized and the whole of the plies is subject to an overstitching with, if necessary, conventional insulating threads which ensure the compaction and the maintenance of all the plies of the preform.

Thus, when the part is finished after resin injection, a face of the part is metallized while the other face not due to the fact that the conductive overstitching thread does not cross the part from one face the other and only a part of the plies on the side of a part face.

In an alternative, the part is metallized on each one of its two faces as it has been just described for a face, a median part of the plies not receiving an overstitching or receiving an overstitching with not electrically conductive threads so that metallization of each face of the part is isolated from the other.

In the case of use of the composite structure to ensure current returns from electrical components, the invention proves to be particularly advantageous.

The metallized parts of the invention are electrically conductive and ensure the electrical continuity between the various assembled parts which allows in a complex structure such as the cell of a aircraft to ensure the current return of the power supply of the equipments by the assembled composite structure thus conductive and this as more easily than the electrical junction of the equipment with the structure by a grounding braid of an equipment can be carried out on any of the two part faces, at least in areas where this possibility will have been made possible by the characteristics of the conductive overstitching.

Part 10 from a composite material of the invention is thus a part whose a dimension, the thickness, includes a stacking of plies 21 formed of fiber embedded in a hard organic resin, the fibers being mineral or organic insulating or slightly conductive (glass, aramid, carbon, . . . ) fibers.

Moreover, in this composite material part, upper threads 31 and lower threads 32, one at least of these two categories of thread consisting in threads carried out from an electrically conductive material and/or with an improved thermal conduction, relatively to the characteristics of the fibers and matrix of the composite material, for example, from copper, aluminum or iron or an alloy based on one of these metals, or a fiber carbon with reinforced thermal conduction, determine, on at least one face of the part, a network formed by sewing lines 34 of a conductive overstitching of at least a portion of the plies 21 of the composite material part located on the side of a face of the conductive part made of composite material, i.e. made electrically and/or thermally conductive in the surface by the presence on the part surface of the electrically and/or thermally conductive threads.

The part 10 thus formed from composite material is, for example, a panel made of carbon fibers embedded in an organic matrix obtained by the RTM method such as an aircraft fuselage panel or a box panel of a plane wing.

In a general way such a part corresponds to any composite material part of which the thickness is mainly the result of a stacking of fiber plies.

In the aircraft field this particularly corresponds, in addition to already mentioned panels, to frames or stiffeners which although of complex forms are made of webs of which the thickness is the result of a plies stacking.

Such parts include, for example, within the thickness E from ten to fifty plies 21 of carbon, Kevlar® or glass fibers according to the expected resistance, the number of plies can vary for the same part according to the considered site on the part.

For the needs of an electrically conductive structure, the upper 31 and/or lower 32 threads of the conductive overstitching are formed by a thread of copper or of another good electrical conductive material of conductive section preferably ranging between 0.005 mm2 and 0.50 mm2 in the most current cases for parts intended to aircraft.

Preferably the electrically conductive threads are threads including a plurality of strands, for example from 1 to 50 strands that can have a diameter ranging between 0.05 to 0.20 mm, in order to have sufficiently flexible threads at the time of their implementations before to be embedded into the hard matrix.

The conductive network formed by the sewing lines includes a first main direction, for example, with a pitch between the sewing lines of approximately 5 mm and a distance between the stitching points of the same magnitude order, and includes at least a second direction such as the sewing lines according to this direction intersect the sewing lines according to the main direction.

From the point of view of the thermal behavior of the considered composite material part, it must be noted that conductive overstitching by means of metal threads, privileged in the case where a metallization of the part is sought, also allows to modify the thermal behavior of a composite material part.

Indeed, the good electricity conductive materials are also, in the field of common materials, good thermal conductive materials.

Thus each stitching crossing the part between its two faces also corresponds to a thermal bridge on these two faces, a thermal bridge whose multiplication because of the stitching number, 80000 stitches per m2 for a distance between the stitches of 5 mm along two sewing lines directions, makes it possible to obtain significant thermal transfer capacities between the two faces of the composite material part by the crossing metal threads.

In the same way the conductive threads on the part surface form a network that conduct heat and is ready to transfer energy in the form of heat between a hot source and a cold source, that these sources are distant or not on a structure and are on the same face or on opposite faces of a structure part.

According to whether the amplification of this effect is sought or that, on the contrary, it is sought to limit it's extent in spite of a metallization, the number of stitches per m2 and the type of electrically conductive material used for the conductive overstitching threads have to be adapted.

For example, the heat transfer capacities of a metallized part between its two faces can be decreased by using stainless steel or Invar threads, whose thermal conduction characteristics are substantially lower than that of copper, and by decreasing if necessary the number of stitches per surface unit.

An application where an improvement of the thermal conduction of a composite part, which can be obtained by using a good thermal conductive metallization material such as copper or advantageously if the electrical conduction is not required by using an overstitching by a carbon thread with reinforced thermal conduction or still by superimposing on a metallization overstitching an overstitching by a carbon thread with reinforced thermal conduction, relates to the satellite structures.

In the satellites which moves in the vacuum the equipment cannot be cooled by convection and because of the bad thermal conduction properties of composite materials implemented in the satellite structures, the equipments constituting heat sources are most generally cooled by complex devices of the heat pipe type.

The application of the method of the invention to structure parts of the satellite allows to ensure the heat transfer of the equipments towards radiating devices and to avoid the implementation of more complex devices or at least to limit their number.

Although the described method is particularly adapted to a part produced according to the RTM method, the conductive overstitching operations being easily realized on the preform of dry fiber not coated with resin, said method is also applicable with all the preforms on which overstitching operations can be carried out, i.e. for which it is possible to cross a plies stacking of a preform by means of a stitching needle.

In particular the conductive overstitching can be carried out on preforms whose fibers have been subjected to preliminary treatments like powdered fibers, i.e. including on the fiber surface grains of low size relatively to fibers of a thermoplastic resin intended to give a temporary dimensional stability to the carried out preform.

The conductive overstitching can also be carried out on preforms of fibers preimpregnated with a thermosetting resin, at a stage of the method for producing a composite material part in which the matrix maintaining the part fibers is not yet hardened.

Although the description was detailed with seams using shuttle points implementing two thread, it is also possible to carry out the seams by making chain stitches which require only one single thread, although the machines producing this point type are currently less powerful to carry out seams.

In this solution applied to the invention the single thread of a seam for the conductive overstitching is of course a conductive thread and it should then be understood in the description of the invention that the upper thread on the part upper face and the lower thread on the part lower face are one single thread whose the designation is changed according to the observed face.

It will also be understood that the sewing lines represented as substantially rectilinear on the figures can be of an unspecified form and in particular may include curves adapted to the part shapes.

With the implementation of the method of the invention, by optimizing in any point of the part surface the surface density of the conductive overstitching and its various characteristics, it is thus possible to obtain electric and/or thermal conduction characteristics, optimized in any point of the part and thus to decrease the total mass attributed to the conduction needs and with respect to the metallization to obtain lightened parts relatively to parts including a conventional metallization by a conductive netting on the part surface as well as composite material parts ready to ensure the current return path for electric or electronic components of a vehicle.

The invention claimed is:

1. A part (10), comprising:
    a composite material comprising fibers made of a material having an electrical resistivity equal or greater than $1.5 \times 10^{-6}$ Ω·m embedded in a polymerized organic matrix, the fibers arranged in plies (21) superimposed within a thickness E of the part between an upper face (11) of the part and a lower face (12) of the part; and
    an electrically conductive overstitching (30), including a plurality of sewing lines (34), each of said sewing lines comprising an upper thread (31) on an upper face (11) side and a lower thread (32) on a lower face (12) side, said upper threads (31) and said lower threads (32) intersecting at stitches (33) of said upper threads (31) and said lower threads (32), and said upper threads (31) and said lower threads (32) crossing all or a part of the plies (21) at locations of said stitches (33),
    at least two of the plurality of sewing lines having a first orientation on, respectively, the upper face (11) of the part (10), and the lower face (12) of the part (10), and at least two of the plurality of sewing lines having a second orientation, different from the first orientation, on, respectively, the upper face (11) of the part (10) and the lower face (12) of the part (10), and
    wherein any of the upper threads (31) and the lower threads (32) are electrically conductive and form, respectively on the upper face (11) and the lower face (12), electrically conductive lines, said electrically conductive lines determining a surface network in which the electrically conductive threads are in electrical contact where two electrically conducting lines of different directions overlap on a surface of the part.

2. The part according to claim 1, wherein only one of the upper threads (31) or the lower threads (32) are electrically conductive, said electrically conductive threads crossing only a part of the thickness E of the part (10) at the stitches (33).

3. The part according to claim 1, wherein the electrically conductive threads (31, 32) are metallic threads formed by an assembly of a plurality of strands.

4. The part according to claim 1, wherein the electrically conductive threads (31, 32) have conductive cross-sections ranging between 0.05 mm$^2$ and 0.50 mm$^2$ and include between 1 and 50 strands.

5. The part according to claim 1, wherein distances D between neighboring sewing lines (34) determine on the considered face of the part (10), a surface metallization density having a value in a range of 30 to 500 g/m$^2$.

6. The part according to claim 1, wherein a density of stitches (33) of the electrically conductive overstitching (30) on the surface of the part (10) ranges locally between 2500 and 250000 stitches per m$^2$.

7. The part according to claim 1, wherein a surface density of electrically conductive threads and/or a density of stitches (33) of the electrically conductive overstitching (30) is different according to the sites on the surface of the part (10).

8. The part according to claim 7, wherein the surface density of electrically conductive threads and/or the density of stitches (33) of the electrically conductive overstitching (30) is increased in areas (13) corresponding to fitting surfaces between the part (10) and one or more other electrically conductive parts (10a).

9. The part according to claim 1, wherein the part is configured to be included as part of an aircraft structure, at least one face of the part having electrically conductive overstitching threads that form a metallization that ensures current return for electric or electronic components of the aircraft.

10. The part according to claim 1, wherein the part is configured to be included as part of an aircraft structure, at least one face of the part having electrically conductive overstitching threads that form a metallization that protects the part against effects of a lightning strike.

11. The part according to claim 3, wherein the electrically conductive threads (31, 32) contain copper, aluminum or a steel.

12. The part according to claim 1, wherein a metallization is carried out by means of electrically conductive overstitching threads on a first face of said part, the said threads crossing only partially the thickness of said part, wherein a metallization is carried out by means of electrically conductive overstitching threads on a second face of said part, the threads crossing only partially the a thickness of said part, the overstitching threads on the first face being electrically isolated from the overstitching threads of the second face by plies without electrically conductive threads.

13. An assembly, comprising:
a first part (10) according to claim 1; and
a second part (10*a*),
wherein said first part is metallized on the upper face (11) with the electrically overstitching upper threads (31),
wherein said second part is in contact with a contact area (13) of the lower face (12) of the first part (10), and
wherein, at least in the contact area (13), the overstitching lower threads (32) are electrically conductive, to ensure an electrical continuity between the upper face and the second face in the contact area (13).

14. The assembly according to claim 13, wherein a separation distances between the sewing lines is reduced and/or a distance P separating the successive stitches is reduced, in the contact area (13).

\* \* \* \* \*